(12) United States Patent
Narayan et al.

(10) Patent No.: US 9,490,857 B2
(45) Date of Patent: Nov. 8, 2016

(54) SYSTEMS AND METHODS FOR PARALLEL SIGNAL CANCELLATION

(71) Applicant: III HOLDINGS 1, LLC, Wilmington, DE (US)

(72) Inventors: Anand P. Narayan, Ujire (IN); John K. Thomas, Saratoga, CA (US); Eric S. Olson, Minneapolis, MN (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

(21) Appl. No.: 14/925,515

(22) Filed: Oct. 28, 2015

(65) Prior Publication Data

US 2016/0049974 A1    Feb. 18, 2016

Related U.S. Application Data

(63) Continuation of application No. 12/966,931, filed on Dec. 13, 2010, which is a continuation of application No. 12/871,776, filed on Aug. 30, 2010, which is a continuation of application No. 11/204,606, filed on (Continued)

(51) Int. Cl.
*H04B 1/12* (2006.01)
*H04B 1/7105* (2011.01)
*H04B 1/7107* (2011.01)

(Continued)

(52) U.S. Cl.
CPC ............ *H04B 1/126* (2013.01); *H04B 1/7105* (2013.01); *H04B 1/7107* (2013.01); *H04B 1/7117* (2013.01); *H04B 7/0678* (2013.01); *H04B 7/0891* (2013.01); *H04J 13/0022* (2013.01); *H04J 13/20* (2013.01); *H04B 1/712* (2013.01)

(58) Field of Classification Search
CPC .. H04B 1/126; H04B 1/7105; H04B 1/7107; H04B 1/7117; H04B 7/0678; H04B 7/0891; H04B 1/712; H04J 13/0022
USPC .......................................................... 375/346
See application file for complete search history.

(56) References Cited

U.S. PATENT DOCUMENTS

| 3,742,201 | A | 6/1973 | Groginsky | 235/156 |
| 4,088,955 | A | 5/1978 | Baghdady | 325/56 |

(Continued)

FOREIGN PATENT DOCUMENTS

| DE | 4201439 | 7/1993 | ............. H04L 27/00 |
| DE | 4326843 | 2/1995 | ............... H04B 7/08 |

(Continued)

OTHER PUBLICATIONS

Wang et al., Orthogonal subspace projection-based approaches to classification of MR image sequences, pp. 465-474, 2001.

(Continued)

*Primary Examiner* — Freshteh N Aghdam
(74) *Attorney, Agent, or Firm* — McAndrews, Held & Malloy, Ltd.

(57) ABSTRACT

A receiver includes a first finger that receives a non-interference-cancelled signal and output first demodulated data, a first phase estimate, and a first PN code. The receiver also includes a second finger that selectively receives the non-interference-cancelled signal and a first interference-cancelled signal generated from the non-interference-cancelled signal based on the first phase estimate and the first PN code. The second finger also outputs second demodulated data.

19 Claims, 5 Drawing Sheets

Related U.S. Application Data

Aug. 15, 2005, now Pat. No. 7,787,572, which is a continuation-in-part of application No. 11/192,763, filed on Jul. 29, 2005, now Pat. No. 7,463,609, and a continuation-in-part of application No. 11/100,935, filed on Apr. 7, 2005, now abandoned, which is a continuation-in-part of application No. 10/773,777, filed on Feb. 6, 2004, now Pat. No. 7,394,879, and a continuation-in-part of application No. 10/686,359, filed on Oct. 15, 2003, now Pat. No. 7,068,706, and a continuation-in-part of application No. 10/686,829, filed on Oct. 15, 2003, now Pat. No. 7,580,448, and a continuation-in-part of application No. 10/294,834, filed on Nov. 15, 2002, now Pat. No. 7,200,183, and a continuation-in-part of application No. 10/247,836, filed on Sep. 20, 2002, now Pat. No. 7,158,559, said application No. 10/773,777 is a continuation-in-part of application No. 10/763,346, filed on Jan. 23, 2004, now Pat. No. 7,039,136.

(51) Int. Cl.

| | | |
|---|---|---|
| *H04B 1/7117* | (2011.01) | |
| *H04B 7/06* | (2006.01) | |
| *H04B 7/08* | (2006.01) | |
| *H04J 13/20* | (2011.01) | |
| *H04J 13/00* | (2011.01) | |
| *H04B 1/712* | (2011.01) | |

(56) References Cited

U.S. PATENT DOCUMENTS

| | | | | |
|---|---|---|---|---|
| 4,309,769 | A | 1/1982 | Taylor, Jr. | 375/1 |
| 4,359,738 | A | 11/1982 | Lewis | 343/100 |
| 4,601,046 | A | 7/1986 | Halpern et al. | 375/38 |
| 4,665,401 | A | 5/1987 | Garrard et al. | 342/75 |
| 4,670,885 | A | 6/1987 | Parl et al. | 375/1 |
| 4,713,794 | A | 12/1987 | Byington et al. | 365/45 |
| 4,780,885 | A | 10/1988 | Paul et al. | 375/40 |
| 4,856,025 | A | 8/1989 | Takai | 375/40 |
| 4,893,316 | A | 1/1990 | Janc et al. | 375/44 |
| 4,922,506 | A | 5/1990 | McCallister et al. | 375/1 |
| 4,933,639 | A | 6/1990 | Barker | 324/309 |
| 4,965,732 | A | 10/1990 | Roy, III et al. | 364/460 |
| 5,017,929 | A | 5/1991 | Tsuda | 342/427 |
| 5,099,493 | A | 3/1992 | Zeger et al. | 375/1 |
| 5,101,501 | A | 3/1992 | Gilhousen et al. | |
| 5,105,435 | A | 4/1992 | Stilwell | 375/1 |
| 5,109,390 | A | 4/1992 | Gilhousen et al. | 375/1 |
| 5,109,528 | A | 4/1992 | Uddenfeldt | |
| 5,119,401 | A | 6/1992 | Tsujimoto | 375/14 |
| 5,136,296 | A | 8/1992 | Roettger et al. | 342/26 |
| 5,151,919 | A | 9/1992 | Dent | 375/1 |
| 5,218,359 | A | 6/1993 | Minamisono | 342/383 |
| 5,218,619 | A | 6/1993 | Dent | 375/1 |
| 5,220,687 | A | 6/1993 | Ichikawa et al. | 455/254 |
| 5,224,122 | A | 6/1993 | Bruckert | 375/1 |
| 5,226,045 | A | 7/1993 | Chuang | |
| 5,235,632 | A | 8/1993 | Raith | |
| 5,237,586 | A | 8/1993 | Bottomley | 375/1 |
| 5,260,944 | A | 11/1993 | Tomabechi | |
| 5,260,988 | A | 11/1993 | Schellinger et al. | |
| 5,263,191 | A | 11/1993 | Dickerson | 455/304 |
| 5,267,261 | A | 11/1993 | Blakeney, II et al. | |
| 5,280,472 | A | 1/1994 | Gilhousen et al. | 370/18 |
| 5,305,349 | A | 4/1994 | Dent | 375/1 |
| 5,325,394 | A | 6/1994 | Bruckert | 375/1 |
| 5,327,578 | A | 7/1994 | Breeden et al. | 455/34.2 |
| 5,333,175 | A | 7/1994 | Ariyavisitakul et al. | 379/58 |
| 5,343,493 | A | 8/1994 | Karimullah | 375/1 |
| 5,343,496 | A | 8/1994 | Honig et al. | 375/1 |
| 5,347,535 | A | 9/1994 | Karasawa et al. | 375/1 |
| 5,353,302 | A | 10/1994 | Bi | 375/1 |
| 5,367,558 | A | 11/1994 | Gillig et al. | |
| 5,377,183 | A | 12/1994 | Dent | 370/18 |
| 5,386,202 | A | 1/1995 | Cochran et al. | 332/100 |
| 5,390,207 | A | 2/1995 | Fenton et al. | 375/1 |
| 5,390,233 | A | 2/1995 | Jensen et al. | |
| 5,392,331 | A | 2/1995 | Patsiokas et al. | |
| 5,394,110 | A | 2/1995 | Mizoguchi | 329/304 |
| 5,396,256 | A | 3/1995 | Chiba et al. | 342/372 |
| 5,406,615 | A | 4/1995 | Miller, II et al. | |
| 5,428,601 | A | 6/1995 | Owen | |
| 5,437,055 | A | 7/1995 | Wheatley, III | 455/33.3 |
| 5,440,265 | A | 8/1995 | Cochran et al. | 329/300 |
| 5,442,680 | A | 8/1995 | Schellinger et al. | |
| 5,448,600 | A | 9/1995 | Lucas | 375/205 |
| 5,448,619 | A | 9/1995 | Evans et al. | |
| 5,475,677 | A | 12/1995 | Arnold et al. | 370/29 |
| 5,481,570 | A | 1/1996 | Winters | 375/347 |
| 5,488,649 | A | 1/1996 | Schellinger | 379/62 |
| 5,506,865 | A | 4/1996 | Weaver, Jr. | 375/205 |
| 5,507,035 | A | 4/1996 | Bantz et al. | |
| 5,509,052 | A | 4/1996 | Chie et al. | 379/61 |
| 5,513,176 | A | 4/1996 | Dean et al. | 370/18 |
| 5,515,420 | A | 5/1996 | Urasaka et al. | 379/61 |
| 5,533,011 | A | 7/1996 | Dean et al. | 370/18 |
| 5,533,027 | A | 7/1996 | Akerberg et al. | |
| 5,553,098 | A | 9/1996 | Cochran et al. | 375/324 |
| 5,594,782 | A | 1/1997 | Zicker et al. | |
| 5,602,833 | A | 2/1997 | Zehavi | 370/209 |
| 5,610,969 | A | 3/1997 | McHenry et al. | |
| 5,634,193 | A | 5/1997 | Ghisler | |
| 5,640,414 | A | 6/1997 | Blakeney, II et al. | |
| 5,644,592 | A | 7/1997 | Divsalar et al. | 375/206 |
| 5,659,598 | A | 8/1997 | Byrne et al. | |
| 5,659,878 | A | 8/1997 | Uchida et al. | |
| 5,664,005 | A | 9/1997 | Emery et al. | |
| 5,673,307 | A | 9/1997 | Holland et al. | |
| 5,675,629 | A | 10/1997 | Raffel et al. | |
| 5,724,658 | A | 3/1998 | Hasan | |
| 5,732,076 | A | 3/1998 | Ketseoglou et al. | |
| 5,736,964 | A | 4/1998 | Ghosh et al. | 342/457 |
| 5,745,852 | A | 4/1998 | Khan et al. | |
| 5,758,281 | A | 5/1998 | Emery et al. | |
| 5,787,130 | A | 7/1998 | Kotzin et al. | 375/346 |
| 5,796,727 | A | 8/1998 | Harrison et al. | |
| 5,796,729 | A | 8/1998 | Greaney et al. | |
| 5,812,086 | A | 9/1998 | Bertiger et al. | 342/357 |
| 5,812,511 | A | 9/1998 | Kawamura et al. | 369/77.2 |
| 5,815,525 | A | 9/1998 | Smith et al. | |
| 5,818,820 | A | 10/1998 | Anderson et al. | |
| 5,822,681 | A | 10/1998 | Chang et al. | |
| 5,822,767 | A | 10/1998 | MacWilliams et al. | 711/146 |
| 5,825,759 | A | 10/1998 | Liu | |
| 5,844,521 | A | 12/1998 | Stephens et al. | 342/357 |
| 5,852,767 | A | 12/1998 | Sugita | |
| 5,859,613 | A | 1/1999 | Otto | 342/463 |
| 5,862,345 | A | 1/1999 | Okanoue et al. | 395/200.68 |
| 5,870,677 | A | 2/1999 | Takahashi et al. | |
| 5,872,540 | A | 2/1999 | Casabona et al. | 342/362 |
| 5,872,776 | A | 2/1999 | Yang | 370/342 |
| 5,887,020 | A | 3/1999 | Smith et al. | |
| 5,887,260 | A | 3/1999 | Nakata | |
| 5,890,055 | A | 3/1999 | Chu et al. | |
| 5,890,064 | A | 3/1999 | Widergen et al. | |
| 5,894,500 | A | 4/1999 | Bruckert et al. | 375/346 |
| 5,903,834 | A | 5/1999 | Wallstedt et al. | |
| 5,915,224 | A | 6/1999 | Jonsson | |
| 5,926,760 | A | 7/1999 | Khan et al. | |
| 5,926,761 | A | 7/1999 | Reed et al. | 455/440 |
| 5,930,229 | A | 7/1999 | Yoshida et al. | 370/203 |
| 5,936,949 | A | 8/1999 | Pasternak et al. | |
| 5,940,512 | A | 8/1999 | Tomoike | |
| 5,946,622 | A | 8/1999 | Bojeryd | |
| 5,949,773 | A | 9/1999 | Bhalla et al. | |
| 5,953,369 | A | 9/1999 | Suzuki | 375/206 |
| 5,960,341 | A | 9/1999 | LeBlanc et al. | |
| 5,960,361 | A | 9/1999 | Chen | 455/522 |
| 5,960,364 | A | 9/1999 | Dent | 455/552 |
| 5,978,413 | A | 11/1999 | Bender | 375/206 |
| 5,987,010 | A | 11/1999 | Schnizlein | 370/280 |

(56) References Cited

U.S. PATENT DOCUMENTS

| | | | |
|---|---|---|---|
| 5,995,499 A | 11/1999 | Hottinen et al. | 370/337 |
| 5,995,828 A | 11/1999 | Nishida | |
| 6,002,727 A | 12/1999 | Uesugi | 375/346 |
| 6,014,373 A | 1/2000 | Schilling et al. | 370/342 |
| 6,016,318 A | 1/2000 | Tomoike | |
| 6,018,317 A | 1/2000 | Dogan et al. | 342/378 |
| 6,032,056 A | 2/2000 | Reudink | 455/560 |
| 6,035,193 A | 3/2000 | Buhrmann et al. | |
| 6,052,592 A | 4/2000 | Schellinger et al. | |
| 6,078,611 A | 6/2000 | La Rosa et al. | 375/206 |
| 6,088,383 A | 7/2000 | Suzuki et al. | 375/148 |
| 6,101,176 A | 8/2000 | Honkasalo et al. | |
| 6,101,385 A | 8/2000 | Monte et al. | 455/427 |
| 6,104,712 A | 8/2000 | Robert et al. | 370/389 |
| 6,112,080 A | 8/2000 | Anderson et al. | |
| 6,112,088 A | 8/2000 | Haartsen | |
| 6,115,409 A | 9/2000 | Upadhyay et al. | 375/144 |
| 6,119,000 A | 9/2000 | Stephenson et al. | |
| 6,127,973 A | 10/2000 | Choi et al. | 342/378 |
| 6,130,886 A | 10/2000 | Ketseoglou et al. | |
| 6,131,013 A | 10/2000 | Bergstrom et al. | 455/63 |
| 6,134,227 A | 10/2000 | Magana | |
| 6,137,788 A | 10/2000 | Sawahashi et al. | 370/342 |
| 6,138,019 A | 10/2000 | Trompower et al. | |
| 6,141,332 A | 10/2000 | Lavean | 370/335 |
| 6,154,443 A | 11/2000 | Huang et al. | 370/210 |
| 6,157,685 A | 12/2000 | Tanaka et al. | 375/346 |
| 6,157,842 A | 12/2000 | Karlsson et al. | 455/456 |
| 6,157,847 A | 12/2000 | Buehrer et al. | 455/561 |
| 6,163,696 A | 12/2000 | Bi et al. | 455/436 |
| 6,166,690 A | 12/2000 | Lin et al. | 342/383 |
| 6,172,969 B1 | 1/2001 | Kawakami et al. | 370/342 |
| 6,173,008 B1 | 1/2001 | Lee | 375/148 |
| 6,175,587 B1 | 1/2001 | Madhow et al. | 375/148 |
| 6,192,067 B1 | 2/2001 | Toda et al. | 375/144 |
| 6,201,799 B1 | 3/2001 | Huang et al. | 370/342 |
| 6,215,812 B1 | 4/2001 | Young et al. | 375/144 |
| 6,219,376 B1 | 4/2001 | Zhodzishsky et al. | 375/148 |
| 6,222,828 B1 | 4/2001 | Ohlson et al. | 370/320 |
| 6,226,515 B1 | 5/2001 | Pauli et al. | |
| 6,230,180 B1 | 5/2001 | Mohamed | 708/523 |
| 6,233,229 B1 | 5/2001 | Ranta et al. | 370/330 |
| 6,233,459 B1 | 5/2001 | Sullivan et al. | 455/456 |
| 6,236,852 B1 | 5/2001 | Veerasamy et al. | |
| 6,240,124 B1 | 5/2001 | Wiedeman et al. | 375/130 |
| 6,243,581 B1 | 6/2001 | Jawanda | |
| 6,252,535 B1 | 6/2001 | Kober et al. | 341/155 |
| 6,256,336 B1 | 7/2001 | Rademacher et al. | 375/140 |
| 6,256,511 B1 | 7/2001 | Brown et al. | |
| 6,259,688 B1 | 7/2001 | Schilling et al. | 370/342 |
| 6,263,208 B1 | 7/2001 | Chang et al. | 455/456 |
| 6,263,211 B1 | 7/2001 | Brunner et al. | |
| 6,266,529 B1 | 7/2001 | Chheda | 455/436 |
| 6,269,075 B1 | 7/2001 | Tran | 370/206 |
| 6,269,086 B1 | 7/2001 | Magana et al. | |
| 6,275,186 B1 | 8/2001 | Kong | 342/363 |
| 6,278,726 B1 | 8/2001 | Mesecher et al. | 375/148 |
| 6,282,231 B1 | 8/2001 | Norman et al. | 375/144 |
| 6,282,233 B1 | 8/2001 | Yoshida | |
| 6,285,316 B1 | 9/2001 | Nir et al. | 342/357.09 |
| 6,285,319 B1 | 9/2001 | Rose | 342/449 |
| 6,285,861 B1 | 9/2001 | Bonaccorso et al. | 455/137 |
| 6,295,311 B1 | 9/2001 | Sun | 375/147 |
| 6,301,289 B1 | 10/2001 | Bejjani et al. | 375/144 |
| 6,304,618 B1 | 10/2001 | Hafeez et al. | 375/341 |
| 6,308,072 B1 | 10/2001 | Labedz et al. | 455/448 |
| 6,310,704 B1 | 10/2001 | Dogan et al. | 359/127 |
| 6,317,453 B1 | 11/2001 | Chang | 375/140 |
| 6,320,873 B1 | 11/2001 | Nevo et al. | |
| 6,321,090 B1 | 11/2001 | Soliman | 455/440 |
| 6,324,159 B1 | 11/2001 | Mennekens et al. | 370/203 |
| 6,327,470 B1 | 12/2001 | Ostling | |
| 6,327,471 B1 | 12/2001 | Song | 455/440 |
| 6,330,460 B1 | 12/2001 | Wong et al. | 455/562 |
| 6,333,947 B1 | 12/2001 | van Heeswyk et al. | 375/148 |
| 6,351,235 B1 | 2/2002 | Stilp | 342/357.06 |
| 6,351,642 B1 | 2/2002 | Corbett et al. | 455/442 |
| 6,359,872 B1 | 3/2002 | Mahany et al. | |
| 6,359,874 B1 | 3/2002 | Dent | 370/342 |
| 6,362,760 B2 | 3/2002 | Kober et al. | 341/141 |
| 6,363,104 B1 | 3/2002 | Bottomley | 375/148 |
| 6,374,102 B1 | 4/2002 | Brachman et al. | |
| 6,377,636 B1 | 4/2002 | Paulraj et al. | 375/346 |
| 6,380,879 B2 | 4/2002 | Kober et al. | 341/155 |
| 6,381,457 B1 | 4/2002 | Carlsson et al. | |
| 6,385,264 B1 | 5/2002 | Terasawa et al. | 375/371 |
| 6,389,059 B1 | 5/2002 | Smith et al. | |
| 6,396,804 B2 | 5/2002 | Odenwalder | 370/209 |
| 6,404,760 B1 | 6/2002 | Holtzman et al. | 370/342 |
| 6,415,158 B1 | 7/2002 | King et al. | |
| 6,426,819 B1 | 7/2002 | Crimmins et al. | 359/136 |
| 6,430,216 B1 | 8/2002 | Kober | 375/148 |
| 6,430,395 B2 | 8/2002 | Arazi et al. | |
| 6,434,389 B1 | 8/2002 | Meskanen et al. | 455/437 |
| 6,445,921 B1 | 9/2002 | Bell | |
| 6,459,693 B1 | 10/2002 | Park et al. | 370/342 |
| 6,463,307 B1 | 10/2002 | Larsson et al. | |
| 6,498,934 B1 | 12/2002 | Muller | 455/450 |
| 6,501,788 B1 | 12/2002 | Wang et al. | 375/148 |
| 6,515,980 B1 | 2/2003 | Bottomley | 370/342 |
| 6,539,237 B1 | 3/2003 | Sayers et al. | |
| 6,542,516 B1 | 4/2003 | Vialen et al. | |
| 6,553,219 B1 | 4/2003 | Vilander et al. | |
| 6,556,822 B1 | 4/2003 | Matsumoto | |
| 6,556,825 B1 | 4/2003 | Mansfield | |
| 6,556,830 B1 | 4/2003 | Lenzo | |
| 6,570,909 B1 | 5/2003 | Kansakoski et al. | 375/148 |
| 6,574,266 B1 | 6/2003 | Haartsen | |
| 6,574,270 B1 | 6/2003 | Madkour et al. | 375/148 |
| 6,580,771 B2 | 6/2003 | Kenney | 375/346 |
| 6,584,115 B1 | 6/2003 | Suzuki | 370/441 |
| 6,587,444 B1 | 7/2003 | Lenzo et al. | |
| 6,590,888 B1 | 7/2003 | Ohshima | 370/342 |
| 6,633,614 B1 | 10/2003 | Barton et al. | 375/264 |
| 6,633,761 B1 | 10/2003 | Singhal et al. | |
| 6,643,512 B1 | 11/2003 | Ramaswamy | |
| 6,647,426 B2 | 11/2003 | Mohammed | |
| 6,658,250 B1 | 12/2003 | Ganesan et al. | |
| 6,665,276 B1 | 12/2003 | Culbertson et al. | |
| 6,668,011 B1 | 12/2003 | Li et al. | 375/147 |
| 6,675,009 B1 | 1/2004 | Cook | |
| 6,680,727 B2 | 1/2004 | Butler et al. | 345/147 |
| 6,680,923 B1 | 1/2004 | Leon | |
| 6,711,400 B1 | 3/2004 | Aura | |
| 6,725,025 B1 | 4/2004 | Schmidl et al. | 455/278.1 |
| 6,766,160 B1 | 7/2004 | Lemilainen et al. | |
| 6,788,656 B1 | 9/2004 | Smolentzov et al. | |
| 6,798,737 B1 | 9/2004 | Dabak et al. | 370/209 |
| 6,801,519 B1 | 10/2004 | Mangal | |
| 6,801,565 B1 | 10/2004 | Bottomley et al. | 375/148 |
| 6,801,772 B1 | 10/2004 | Townend et al. | |
| 6,801,777 B2 | 10/2004 | Rusch | |
| 6,807,417 B2 | 10/2004 | Sallinen et al. | |
| 6,824,048 B1 | 11/2004 | Itabashi et al. | |
| 6,826,154 B2 | 11/2004 | Subbiah et al. | |
| 6,829,227 B1 | 12/2004 | Pitt et al. | |
| 6,842,462 B1 | 1/2005 | Ramjee et al. | |
| 6,845,095 B2 | 1/2005 | Krishnarajah et al. | |
| 6,853,851 B1 | 2/2005 | Rautiola et al. | 455/553.1 |
| 6,882,678 B2 | 4/2005 | Kong et al. | 375/144 |
| 6,895,255 B1 | 5/2005 | Bridgelall | |
| 6,909,705 B1 | 6/2005 | Lee et al. | |
| 6,922,559 B2 | 7/2005 | Mohammed | |
| 6,925,074 B1 | 8/2005 | Vikberg et al. | |
| 6,937,862 B2 | 8/2005 | Back et al. | |
| 6,970,719 B1 | 11/2005 | McConnell et al. | |
| 6,975,666 B2 | 12/2005 | Affes et al. | 375/130 |
| 7,009,952 B1 | 3/2006 | Razavilar et al. | |
| 7,012,977 B2 * | 3/2006 | Madkour | H04B 1/7107 375/144 |
| 7,272,176 B2 | 9/2007 | Wei et al. | 375/232 |
| 7,272,397 B2 | 9/2007 | Gallagher et al. | |
| 7,324,584 B1 | 1/2008 | Vigneron et al. | 375/150 |
| 7,873,015 B2 | 1/2011 | Gallagher et al. | |

(56) References Cited

U.S. PATENT DOCUMENTS

| | | | |
|---|---|---|---|
| 8,270,453 B2 | 9/2012 | Khayrallah | |
| 2001/0003443 A1 | 6/2001 | Velazquez et al. | 342/367 |
| 2001/0020912 A1 | 9/2001 | Naruse et al. | 342/357.06 |
| 2001/0021646 A1 | 9/2001 | Antonucci et al. | 455/404 |
| 2001/0028677 A1 | 10/2001 | Wang et al. | 375/148 |
| 2001/0029186 A1 | 10/2001 | Canyon et al. | |
| 2001/0031645 A1 | 10/2001 | Jarrett | |
| 2001/0046266 A1 | 11/2001 | Rakib et al. | 375/259 |
| 2001/0046860 A1 | 11/2001 | Lee | |
| 2001/0049790 A1 | 12/2001 | Faccin et al. | |
| 2002/0001299 A1 | 1/2002 | Petch et al. | 370/350 |
| 2002/0032030 A1 | 3/2002 | Berglund et al. | 455/434 |
| 2002/0045459 A1 | 4/2002 | Morikawa | |
| 2002/0051433 A1 | 5/2002 | Affes et al. | 370/335 |
| 2002/0059516 A1 | 5/2002 | Turtiainen et al. | 713/153 |
| 2002/0066036 A1 | 5/2002 | Makineni et al. | |
| 2002/0075844 A1 | 6/2002 | Hagen | |
| 2002/0080797 A1 | 6/2002 | Kim | |
| 2002/0082015 A1 | 6/2002 | Wu | |
| 2002/0085516 A1 | 7/2002 | Bridgelall | |
| 2002/0102974 A1 | 8/2002 | Raith | |
| 2002/0118674 A1 | 8/2002 | Faccin et al. | |
| 2002/0132630 A1 | 9/2002 | Arazi et al. | |
| 2002/0142761 A1 | 10/2002 | Wallstedt et al. | |
| 2002/0147008 A1 | 10/2002 | Kallio | |
| 2002/0147016 A1 | 10/2002 | Arazi et al. | |
| 2002/0155829 A1 | 10/2002 | Proctor, Jr. et al. | |
| 2002/0160811 A1 | 10/2002 | Jannette et al. | |
| 2002/0166068 A1 | 11/2002 | Kilgore | |
| 2002/0172173 A1 | 11/2002 | Schilling et al. | 370/335 |
| 2002/0176488 A1 | 11/2002 | Kober | 375/147 |
| 2002/0191575 A1 | 12/2002 | Kalavade et al. | |
| 2002/0191676 A1 | 12/2002 | Kenneth | 375/130 |
| 2002/0196840 A1 | 12/2002 | Anderson et al. | 375/130 |
| 2002/0197984 A1 | 12/2002 | Monin et al. | |
| 2003/0007475 A1 | 1/2003 | Tsuda et al. | |
| 2003/0031151 A1 | 2/2003 | Sharma et al. | |
| 2003/0043773 A1 | 3/2003 | Chang | |
| 2003/0053524 A1 | 3/2003 | Dent | 375/148 |
| 2003/0053526 A1 | 3/2003 | Reznik | 375/148 |
| 2003/0087653 A1 | 5/2003 | Leung et al. | |
| 2003/0092456 A1 | 5/2003 | Dent | 455/503 |
| 2003/0095529 A1 | 5/2003 | Petre et al. | 370/342 |
| 2003/0112789 A1 | 6/2003 | Heinonen et al. | |
| 2003/0112904 A1 | 6/2003 | Fuller et al. | 375/350 |
| 2003/0119480 A1 | 6/2003 | Mohammed | |
| 2003/0119490 A1 | 6/2003 | Mohammed | |
| 2003/0119527 A1 | 6/2003 | Labun et al. | |
| 2003/0119548 A1 | 6/2003 | Mohammed | |
| 2003/0130008 A1 | 7/2003 | Rajaniemi et al. | |
| 2003/0139180 A1 | 7/2003 | McIntosh et al. | |
| 2003/0142673 A1 | 7/2003 | Patil et al. | |
| 2003/0172264 A1 | 9/2003 | Dillon | 713/160 |
| 2003/0176181 A1 | 9/2003 | Boesjes | 455/406 |
| 2003/0176186 A1 | 9/2003 | Mohammed | |
| 2003/0193952 A1 | 10/2003 | O'Neill | |
| 2003/0202486 A1 | 10/2003 | Anton, Jr. et al. | 370/329 |
| 2003/0210199 A1 | 11/2003 | Sward et al. | |
| 2003/0219022 A1 | 11/2003 | Dillon et al. | 370/395.52 |
| 2003/0219024 A1 | 11/2003 | Purnadi et al. | |
| 2003/0226017 A1 | 12/2003 | Palekar et al. | 713/168 |
| 2004/0008648 A1 | 1/2004 | Schmidl et al. | |
| 2004/0008649 A1 | 1/2004 | Wybenga et al. | |
| 2004/0009749 A1 | 1/2004 | Arazi et al. | |
| 2004/0010620 A1 | 1/2004 | Salo et al. | 709/246 |
| 2004/0013099 A1 | 1/2004 | O'Neill | |
| 2004/0025018 A1 | 2/2004 | Haas et al. | 713/168 |
| 2004/0037312 A1 | 2/2004 | Spear | |
| 2004/0053623 A1 | 3/2004 | Hoff et al. | |
| 2004/0068571 A1 | 4/2004 | Ahmavaara | |
| 2004/0068653 A1 | 4/2004 | Fascenda | 713/168 |
| 2004/0071197 A1 | 4/2004 | Lin | |
| 2004/0077346 A1 | 4/2004 | Krenik et al. | 455/426.2 |
| 2004/0077354 A1 | 4/2004 | Jason et al. | 455/450 |
| 2004/0077355 A1 | 4/2004 | Krenik et al. | |
| 2004/0077356 A1 | 4/2004 | Krenik et al. | |
| 2004/0077374 A1 | 4/2004 | Terry | |
| 2004/0087307 A1 | 5/2004 | Ibe et al. | 455/436 |
| 2004/0116120 A1 | 6/2004 | Gallagher et al. | |
| 2004/0136445 A1 | 7/2004 | Olson et al. | 375/316 |
| 2004/0147223 A1 | 7/2004 | Cho | |
| 2004/0171378 A1 | 9/2004 | Rautila | |
| 2004/0192211 A1 | 9/2004 | Gallagher et al. | |
| 2004/0202132 A1 | 10/2004 | Heinonen et al. | |
| 2004/0203346 A1 | 10/2004 | Myhre et al. | |
| 2004/0203458 A1 | 10/2004 | Nigra | 455/67.13 |
| 2004/0203737 A1 | 10/2004 | Myhre et al. | |
| 2004/0203800 A1 | 10/2004 | Myhre et al. | |
| 2004/0203812 A1 | 10/2004 | Malladi et al. | 455/450 |
| 2004/0203815 A1 | 10/2004 | Shoemake et al. | |
| 2005/0063500 A1 | 3/2005 | Li et al. | |
| 2005/0064896 A1 | 3/2005 | Rautiola et al. | |
| 2005/0078769 A1 | 4/2005 | Lo | |
| 2005/0101245 A1 | 5/2005 | Ahmavaara | |
| 2005/0101329 A1 | 5/2005 | Gallagher | |
| 2005/0181805 A1 | 8/2005 | Gallagher | |
| 2005/0186948 A1 | 8/2005 | Gallagher et al. | |
| 2005/0198199 A1 | 9/2005 | Dowling | |
| 2005/0207395 A1 | 9/2005 | Mohammed | |
| 2005/0255879 A1 | 11/2005 | Shi et al. | |
| 2005/0265279 A1 | 12/2005 | Markovic et al. | |
| 2005/0266853 A1 | 12/2005 | Gallagher et al. | |
| 2005/0271008 A1 | 12/2005 | Gallagher et al. | |
| 2005/0272424 A1 | 12/2005 | Gallagher et al. | |
| 2005/0272449 A1 | 12/2005 | Gallagher et al. | |
| 2006/0007895 A1 | 1/2006 | Coralli et al. | 370/335 |
| 2006/0009201 A1 | 1/2006 | Gallagher et al. | |
| 2006/0009202 A1 | 1/2006 | Gallagher et al. | |
| 2006/0019656 A1 | 1/2006 | Gallagher et al. | |
| 2006/0019657 A1 | 1/2006 | Gallagher et al. | |
| 2006/0019658 A1 | 1/2006 | Gallagher et al. | |
| 2006/0025143 A1 | 2/2006 | Gallagher et al. | |
| 2006/0025144 A1 | 2/2006 | Gallagher et al. | |
| 2006/0025145 A1 | 2/2006 | Gallagher et al. | |
| 2006/0025146 A1 | 2/2006 | Gallagher et al. | |
| 2006/0025147 A1 | 2/2006 | Gallagher et al. | |
| 2006/0079258 A1 | 4/2006 | Gallagher et al. | |
| 2006/0079259 A1 | 4/2006 | Gallagher et al. | |
| 2006/0079273 A1 | 4/2006 | Gallagher et al. | |
| 2006/0079274 A1 | 4/2006 | Gallagher et al. | |
| 2006/0098598 A1 | 5/2006 | Gallagher | |
| 2006/0153283 A1 | 7/2006 | Scharf | 375/148 |
| 2006/0229051 A1 | 10/2006 | Narayan | 455/296 |
| 2006/0233224 A1 | 10/2006 | Lotter et al. | |
| 2007/0121554 A1 | 5/2007 | Luo et al. | |
| 2007/0127434 A1* | 6/2007 | Heinle | H04B 1/7117 370/350 |
| 2008/0019429 A1 | 1/2008 | Reznik | |

FOREIGN PATENT DOCUMENTS

| | | | |
|---|---|---|---|
| DE | 4343959 | 6/1995 | H04B 7/08 |
| EP | 0558910 | 1/1993 | H04B 1/16 |
| EP | 0610989 | 1/1994 | H04B 7/04 |
| EP | 0936777 B1 | 8/1999 | |
| EP | 0610989 | 1/2000 | H04B 7/04 |
| EP | 1207708 B1 | 10/2004 | |
| GB | 2280575 | 2/1995 | H04L 27/227 |
| GB | 2282735 A | 4/1995 | |
| JP | 2000-13360 | 1/2000 | H04J 13/04 |
| WO | WO 92/04796 A1 | 3/1992 | |
| WO | WO 93/12590 | 6/1993 | H04B 7/26 |
| WO | WO 97/24004 A1 | 7/1997 | |
| WO | WO 99/48312 A1 | 9/1999 | |
| WO | WO 99/48315 A1 | 9/1999 | |
| WO | WO 00/28762 A1 | 5/2000 | |
| WO | WO 00/51387 A1 | 8/2000 | |
| WO | WO 02/45456 A1 | 6/2002 | |
| WO | WO 03/039009 A2 | 5/2003 | |
| WO | WO 03/039009 A3 | 5/2003 | |
| WO | WO 03/092312 A1 | 11/2003 | |
| WO | WO 04/002051 A2 | 12/2003 | |
| WO | WO 2004/034219 A2 | 4/2004 | |
| WO | WO 2004036770 | 4/2004 | H04Q 7/36 |

(56) References Cited

FOREIGN PATENT DOCUMENTS

| WO | WO 2004/039111 A1 | 5/2004 | |
|---|---|---|---|
| WO | WO 2005/006597 A1 | 1/2005 | |
| WO | WO 2005/107169 A1 | 11/2005 | |
| WO | WO 2005/107297 A1 | 11/2005 | |
| WO | PCT/US2005/016767 | 12/2005 | ............ H04L 12/28 |
| WO | WO 2005/114918 A2 | 12/2005 | |

OTHER PUBLICATIONS

"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards Institute, Sophia-Antipo, FR, vol. 3-CN1, No. V5.6.0, Dec. 2002, pp. 293-317, XP014007949, ISSN: 0000-001. 29 pages.
ETSI TS 100 940 V7.19.1 (Apr. 2003), "Digital cellular telecommunications system (Phase 2+); Mobile radio interface layer 3 specification(3GPP TS 04.08 version 7.19.1 Release 1998)," V7.19.1 Publication, Apr. 2003. 630 pages.
International Search Report and Written Opinion of a Related Application with mail date of Mar. 13, 2006, re PCT/US2005/040689. 12 pages.
Non-published patent application (specification, drawings, claims, abstract) of a related pending U.S. Appl. No. 11/097,866, 68 pages.
Non-published patent application (specification, drawings, claims, abstract) of a related pending U.S. Appl. No. 11/349,024, 110 pages.
Perkins, Charles E., "Simplified Routing for Mobile Computers Using TCP/IP, Wireless LAN Implementation," IBM T.J. Watson Research Center, 0-8186-2625-9/92 1992 Proceeding, IEEE Conference on Sep. 17-18, 1992, pp. 7-13. 7 pages.
Wu et al., "Intelligent Handoff for Mobile Wireless Internet," Mobile Networks and Applications 6, 2001 Kluwer Academic Publishers, Manufactured in the Netherlands, 2001, pp. 67-79. 13 pages.
Notice of Allowance and Fee(s) Due with mail date of May 3, 2010 re U.S. Appl. No. 11/204,606. 7 Pages.
Scharf, et al., "Matched Subspace Detectors," IEEE Transactions on Signal Processing, vol. 42, No. 8, pp. 2146-2157, Aug. 1994.12 pages.
Price, et al., "A Communication Technique for Multipath Channels," Proceedings of the IRE, vol. 46, The Institute of Radio Engineers, New York, NY, US, pp. 555-570. 1958. 16 pages.
Schlegel, Christian, Alexander, Paul and Roy, Sumit, "Coded Asynchronous CDMA and Its Efficient Detection," IEEE Transactions on Information Theory, vol. 44, No. 7, Nov. 1998. 11 pages.
Xie, Zhenhua; Short, Robert T. and Rushforth, Craig K., "A Family of Suboptimum Detectors for Coherent Multiuser Communications," IEEE Journal on Selected Areas in Communications, vol. 8, No. 4, May 1990.pp. 683-690. 8 pages.
Viterbi, Andrew J., "Very Low Rate Convolutional Codes for Maximum Theoretical Performance of Spread-Spectrum Multiple-Access Channels," IEEE Journal on Selected Areas in Communications, vol. 8, No. 4, May 1990, pp. 641-649.. 9 pages.
Verdu, Sergio, "Minimum Probability of Error for Asynchronous Gaussian Multiple-Access Channels," IEEE Transactions on Information Theory, vol. IT-32, No. 1, Jan. 1986. pp. 85-96 .12 pages.
Behrens, Richard T. and Scharf, Louis I., "Signal Processing Applications of Oblique Projection Operators," IEEE Transactions on Signal Processing, vol. 42, No. 6, Jun. 1994, pp. 1413-1424. 12 pages.
Alexander, Paul D., Rasmussen, Lars K., and Schlegel, Christian B., "A Linear Receiver for Coded Multiuser CDMA," IEEE transactions on Communications, vol. 45, No. 5, May 1997. 6 pages.
Schlegel, Christian; Roy, Sumit; Alexander, Paul D.; and Xiang, Zeng-Jun, "Multiuser Projection Receivers," IEEE Journal on Selected Areas in Communications, vol. 14, No. 8, Oct. 1996. 9 pages.
Halper, Christian; Heiss, Michael; and Brasseur, Georg, "Digital-to-Analog Conversion by Pulse-Count Modulation Methods," IEEE Transactions on Instrumentation and Measurement, vol. 45, No. 4, Aug. 1996. 10 pages.
Ortega, J.G.; Janer, C.L.; Quero, J.M.; Franquelo, L.G.; Pinilla, J.; and Serrano, J., "Analog to Digital and Digital to Analog Conversion Based on Stochastic Logic," IEEE 0-7803-3026-9/95, 1995. 5 pages.
Lin, Kun; Zhao, Kan; Chui, Edmund; Krone, Andrew; and Nohrden, Jim; "Digital Filters for High Performance Audio Delta-sigma Analog-to-Digital and Digital-to-Analog Conversions," Proceedings of ICSP 1996, Crystal Semiconductor Corporation, Ausitn, TX,US. pp. 59-63. 5 pages.
Schlegel, C.B.; Xiang, Z-J.; and Roy, S., "Projection Receiver: A New Efficient Multi-User Detector," IEEE 0-7803-2509-5/95, 1995. 5 pages.
Affes, Sofiene; Hansen, Henrik; and Mermelstein, Paul, "Interference Subspace Rejection: A Framework for Multiuser Detection in Wideband CDMA," IEEE Journal on Selected Areas in Communications, vol. 20, No. 2, Feb. 2002. 16 pages.
Schneider, Kenneth S., "Optimum Detection of Code Division Multiplexed Signals," IEEE Transactions on Aerospace and Electronic Systems, vol. AES-15, No. 1, Jan. 1979.pp. 181-185. 5 pages.
Mitra, Urbashi, and Poor, H. Vincent, "Adaptive Receiver Algorithms for Near-Far Resistant CDMA," IEEE Transactions of Communications, vol. 43, No. 2/3/4, Feb./Mar./Apr. 1995. 12 pages.
Lupas, Ruxandra and Verdu, Sergio, "Near-Far Resistance of Multiuser Detectors in Asynchronous Channels," IEEE transactions on Communications, vol. 38, No. 4, Apr. 1990. 13 pages.
Lupas, Ruxandra and Verdu, Sergio, "Linear Multiuser Detectors for Synchronous Code-Division Multiple-Access Channels," IEEE Transactions on Information Theory, vol. 35, No. 1, Jan. 1989. 14 pages.
Cheng, Unjeng, Hurd, William J., and Statman, Joseph I., "Spread-Spectrum Code Acquisition in the Presence of Doppler Shift and Data Modulation," IEEE Transactions on Communications, vol. 38, No. 2, Feb. 1990. 10 pages.
Behrens, Richard T. and Scharf, Louis L., "Parameter Estimation in the Presence of Low Rank Noise," 22ACSSC-12/88/0341, pp. 341-344, Maple Press, Nov. 1988. Proceeding of the Twenty-second Asilomar Conference on Signals Systems and Computers, Pacific Grove, C.A..4 pages.
Iltis, Ronald A. and Mailaender, Laurence, "Multiuser Detection of Quasisynchronous CDMA Signals Using Linear Decorrelators," IEEE Transactions on Communications, vol. 44, No. 11, Nov. 1996. 11 pages.
Duel-Hallen, Alexandra, "Decorrelating Decision-Feedback Multiuser Detector for Synchronous Code-Division Multiple-Access Channel," IEEE Transactions on Communications, vol. 41, No. 2, Feb. 1993, pp. 285-290. 6 pages.
Schlegel, Christian and Xiang, Zengjun, "A New Projection Receiver for Coded Synchronous Multi-User CDMA Systems," Proceedings, 1995, IEEE International Symposium on Information Theory, p. 318, Sep. 17, 1995. 1 page.
Zheng, Fu-Chun and Barton, Stephen K., "On the Performance of Near-Far Resistant CDMA Detectors in the Presence of Synchronization Errors," IEEE Transactions on Communications, vol. 43, No. 12 (pp. 3037-3045), Dec. 1995. 9 pages.
Mitra, Urbashi and Poor, H. Vincent, "Adaptive Decorrelating Detectors for CDMA Systems," Accepted for publication in the Wireless Personal Communications Journal, accepted May 1995. 25 pages.
Frankel et al., "High-performance photonic analogue-digital converter," Electronic Letters, Dec. 4, 1997, vol. 33, No. 25, pp. 2096-2097. 2 pages.
Stimson, George W., "An Introduction to Airborne Radar," 2nd Edition, SciTech Publishing Inc., Mendham, NJ,US. 1998, pp. 163-176 and 473-491. 40 pages.

(56) References Cited

OTHER PUBLICATIONS

Kaplan, Elliott D., Editor, "Understanding GPS—Principles and Applications," Artech House, Norwood MA,US. 1996, pp. 152-236. (Provided publication missing pp. 83-151 of cited reference.) 46 pages.

Rappaport, Theodore S., Editor, "Wireless Communications—Principles & Practice," Prentice Hall, Upper Saddle River, NJ,US, 1996, pp. 518-533. 14 pages.

Best, Roland E., "Phase-Locked Loops—Design, Simulation, and Applications," 4th edition, McGraw-Hill, 1999. pp. 251-287. 23 pages.

Garg, Vijay K. and Wilkes, Joseph E., "Wireless and Personal Communications Systems," Prentice Hall PTR, Upper Saddle River, NJ, US. pp. 79-151, 1996. 45 pages.

Kohno, Ryuji, Imaj, Hideki, and Hatori, Mitsutoshi, "Cancellation techniques of Co-Channel Interference in Asynchronous Spread Spectrum Multiple Access Systems," Electronics and Common. In Japan, May 1983, vol. J 56-A, pp. 20-29, No. 5. 8 pages.

Thomas, John K., "Thesis for the Doctor of Philosophy Degree," UMI Dissertation Services, Jun. 28, 1996. Ann Arbor, MI, US. 117 pages.

Viterbi, Andrew J., "CDMA—Principles of Spread Spectrum Communication," Addison-Wesley Publishing Company, Reading, MA,US. 1995, pp. 11-75 and 179-233. 66 pages.

Behrens, Richard T., "Subspace Signal Processing in Structured Noise," UMI Dissertation Services, Ann Arbor, MI,US.Nov. 30, 1990. 166 pages.

Scharf, Louis L., "Statistical Signal Processing—Detection, Estimation, and Time Series Analysis," Addison-Wesley Publishing Company, Reading, MA, US. 1991, pp. 23-75 and 103-178. 74 pages.

Preliminary Amendment submitted on Sep. 29, 2010, re U.S. Appl. No. 12/871,776. 8 pages.

Office Action with mail date of Feb. 21, 2007, re U.S. Appl. No. 11/129,131, 22 pages.

Final Office Action with mail date of Aug. 18, 2006, re U.S. Appl. No. 11/226,610, 13 pages.

B. Widrow, S. Sterns, Adaptive Signal Processing, Prentice-Hall Signal Processing Series, 1985. 84 pages.

Non-Final Office Action dated Jul. 31, 2008 for U.S. Appl. No. 11/100,935, 35 pages.

\* cited by examiner

SYSTEMS AND METHODS FOR PARALLEL SIGNAL CANCELLATION

This application claims priority to and is a continuation of U.S. patent application Ser. No. 12/966,931, entitled "Systems and Methods for Parallel Signal Cancellation" and filed Dec. 13, 2010; which claims priority to U.S. patent application Ser. No. 12/871,776, entitled "Advanced Signal Processors for Interference Cancellation in Baseband Receivers," and filed Aug. 30, 2010; which claims priority to U.S. patent application Ser. No. 11/204,606, entitled "Advanced Signal Processors for Interference Cancellation in Baseband Receivers," filed Aug. 15, 2005, and issued as U.S. Pat. No. 7,787,572; which claims priority to (1) U.S. patent application Ser. No. 11/192,763, entitled "Interference Cancellation Within Wireless Transceivers," filed Jul. 29, 2005, and issued as U.S. Pat. No. 7,463,609 and (2) U.S. patent application Ser. No. 11/100,935, entitled "Construction of Projection Operators for Interference Cancellation," filed Apr. 7, 2005, and published as U.S. Patent Application Publication Number 2005-0180364 A1, which claims priority to (a) U.S. patent application Ser. No. 10/773,777, entitled "Systems and Methods for Parallel Signal Cancellation," filed Feb. 6, 2004, and issued as U.S. Pat. No. 7,394,879, which is a continuation-in-part of U.S. application Ser. No. 10/763,346 filed Jan. 23, 2004, and issued as U.S. Pat. No. 7,039,136 on May 2, 2006; (b) U.S. patent application Ser. No. 10/686,359, entitled "System and Method for Adjusting Phase," filed Oct. 15, 2003, and issued as U.S. Pat. No. 7,068,706; (c) U.S. patent application Ser. No. 10/686,829, entitled "Method and Apparatus for Channel Amplitude Estimation and Interference Vector Construction," filed Oct. 15, 2003, and issued as U.S. Pat. No. 7,580,448; (d) U.S. patent application Ser. No. 10/294,834, entitled "Construction of an Interference Matrix for a Coded Signal Processing Engine," filed Nov. 15, 2002, and issued as U.S. Pat. No. 7,200,183; and (e) U.S. patent application Ser. No. 10/247,836, entitled "Serial Cancellation Receiver Design for a Coded Signal Processing Engine," filed Sep. 20, 2002, and issued as U.S. Pat. No. 7,158,559. The entirety of each of the foregoing patents, patent applications, and patent application publications is incorporated by reference herein.

BACKGROUND

1. Field of the Invention

The invention generally relates to the field of communications. More specifically the invention is related to interference suppression for use in coded signal communications, such as Code Division Multiple Access ("CDMA") communications.

2. Discussion of the Related Art

Interference in communications obstructs the intended reception of a signal and is a persistent problem. Interference may exist in many forms. In CDMA communications, for example, interference is typically the result of receiving one or more unwanted signals simultaneously with a selected signal. These unwanted signals may disrupt the reception of the selected signal because of mutual interference. This disruption of the selected signal is typical in CDMA telephony systems and may corrupt data retrieval processes of a selected signal.

In CDMA telephony, a communications system typically includes a plurality of "base stations" providing a coverage area within a geographic region. These base stations communicate with mobile telephones and/or other CDMA devices operating within the coverage area. To illustrate, a base station provides a coverage "cell" within the overall communication coverage area maintained by the communications system. While within a particular cell, a mobile telephone, or "handset", can communicate with the base station providing the coverage for that cell. As the mobile telephone moves to the cell of another base station, communications between the mobile telephone and the base station providing the initial cell coverage can be transferred via a "hand off" to the other base station.

Each base station within a CDMA telephony system uses coded signals to communicate with mobile telephones. For example, typical CDMA telephony systems use pseudorandom number (PN) spreading codes, sometimes referred to as "short codes," to encode data signals. These encoded data signals are transmitted to and from mobile telephones to convey digitized voice and/or other forms of communication. PN codes are known to those skilled in the art. The terms coded signals and encoded signals are interchangeably used herein.

To encode the data signals, the base station applies a PN code to the data at a rate faster than that of the data. For example, the PN code is applied to the data such that there are multiple "chips" of the code for any given element of data. Such an application of the PN code is commonly referred to as direct sequence spreading of the data. Chips and their associated chip rates are known to those skilled in the art.

Sometimes, each base station is assigned a particular timing offset of the short code to differentiate between base stations. Mobile telephones may therefore determine the identity of a particular base station based on the timing offset of the short code. Additionally, the data signals are often further encoded with a unique "covering" code. Such covering codes provide "channelization" for a signal that increases the number of unique communication channels. For example, data encoded with a covering code can further differentiate signals thereby improving detection and subsequent processing of a selected signal.

These covering codes are often used in CDMA telephony systems and typically include families of codes that are orthogonal (e.g., Walsh codes) or codes that are substantially orthogonal (e.g. quasi-orthogonal functions ("QOF")). Orthogonal covering codes and QOF covering codes have properties that allow for the differentiation of unwanted signals and are known to those skilled in the art. Walsh codes are also known to those skilled in the art.

Both the short codes and the covering codes assist in the detection of a selected signal. However, interference caused by other signals may still degrade data extraction capabilities of the selected signal. For example, as a mobile telephone communicates with a particular base station within that base station's coverage cell, signals from other base stations can interfere with the mobile telephone communication. Since cells often overlap one another to ensure that all desired geographic regions are included in the communication system's coverage area, one or more signals from one base station may interfere with the communication link, or "channel," between the mobile telephone and another base station. This effect is commonly referred to as cross-channel interference.

Cross-channel interference may also occur because some overhead channels are broadcast to all mobile telephones within the cell. These channels can "bleed" over into other cells and overpower a selected signal, thereby corrupting conveyed data. Examples of such channels include pilot channels, which are often broadcast at greater power levels and convey reference information and can be used to coherently demodulate other channels. Other potentially interfering channels may convey paging channels that alert a particular mobile telephone to an incoming call and synchronization channels that provides synchronization between a mobile telephone and a base station. Still other potentially interfering channels may include traffic channels bearing user traffic such as data and voice.

Still, other forms of interference may occur from "multipath" copies of a selected signal. Multipath can create interference because of the reception of copies of a selected signal at differing times. Multipath typically occurs because of obstructions, such as buildings, trees, et cetera, that create multiple transmission paths for a selected signal. These separate transmission paths may have unique distances that cause the signal to arrive at a receiver at differing times and is commonly referred to as co-channel interference. Additionally, these separate paths may bleed over into other cells to cause cross-channel interference.

Multipath creates co-channel interference because, among other reasons, the orthogonality of the covering code for a received signal is essentially lost due to timing offsets associated with the multipath. For example, a multipath signal having a covering code and arriving at a receiver at differing times causes a misalignment of the covering code. Such a misalignment can result in a high cross-correlation in the covering codes and a general inability to correctly retrieve conveyed data.

"Rake" receivers, such as those used in CDMA telephony systems, combine multipath signals to increase available signal strength. For example, a rake receiver may have a plurality of "fingers," wherein each finger of the rake receiver independently estimates channel gain and other signal characteristics (e.g., phase) of the selected signal to more accurately demodulate data of the selected signal and subsequently retrieve the data. Each finger is assigned a particular "path" of the selected signal (i.e., one of the paths of the multipath signal or a signal from another base station). These paths may be combined to increase signal strength. Additionally, as signal characteristics change, the fingers may be assigned or de-assigned to other "paths" of the signal to improve data retrieval.

Rake receivers can improve data retrieval of a received signal. However, present rake receivers do not substantially reduce cross-channel interference and/or co-channel interference. These interferers may still corrupt data as long as they exist in any substantial form.

SUMMARY

The present invention provides systems and methods for parallel interference suppression. In one embodiment of the invention, a processing engine is used to substantially cancel a plurality of interfering components within a received signal. The processing engine includes a plurality of matrix generators that are used to generate matrices, each matrix comprising elements of a unique component selected for cancellation. The processing engine also includes one or more processors that use the matrices to generate cancellation operators. A plurality of applicators applies the cancellation operators to parallel but not necessarily unique input signals to substantially cancel the interfering components from the input signals. These input signals may include received signals, interference cancelled signals and/or PN codes. The embodiments disclosed herein may be particularly advantageous to systems employing CDMA (e.g., such as cdmaOne and cdma2000), Wideband CDMA, Broadband CDMA and Global Positioning System ("GPS") signals. Such systems are known to those skilled in the art.

In one embodiment of the invention, a processing engine comprises:

a plurality of matrix generators, wherein each matrix generator is configured for generating a matrix comprising elements of an interfering signal selected for cancellation;

a processor communicatively coupled to the matrix generators and configured for generating a cancellation operator from each matrix; and a plurality of applicators, wherein each applicator is communicatively coupled to the processor and configured for applying one of the cancellation operators to an input signal to substantially cancel one of the interfering signals.

In another embodiment of the invention, the processing engine is configurable with a receiver and wherein the processing engine further comprises a connection element configured for receiving output signals from the applicators and for selecting received said output signals as inputs to processing fingers of the receiver.

In another embodiment of the invention, the connection element comprises a plurality of selectors wherein each selector is configured for receiving one of the output signals and for selecting said one of the output signals as one of the inputs to one of the processing fingers.

In another embodiment of the invention, each selector is further configured for receiving a digitized radio signal comprising one or more Code Division Multiple Access signals as one of the inputs to one of the processing fingers.

In another embodiment of the invention, each selector is further configured for receiving a digitized radio signal comprising one or more Wideband Code Division Multiple Access signals as one of the inputs to one of the processing fingers.

In another embodiment of the invention, each selector is further configured for receiving a digitized radio signal comprising one or more Global Positioning System signals as one of the inputs to one of the processing fingers.

In another embodiment of the invention, the output signals are interference cancelled signals.

In another embodiment of the invention, each cancellation operator is a projection operator configured for projecting a selected signal substantially orthogonal to one of the interfering signals.

In another embodiment of the invention, the projection operator comprises the form:

$$P_s^\perp = I - S(S^T S)^{-1} S^T,$$

where $P_s^\perp$ is the projection operator, I is an identity matrix, S is one of the matrices and $S^T$ is a transpose of said one of the matrices.

In another embodiment of the invention, each of the cancellation operators comprises the form:

$$y' = y - S(S^T S)^{-1} S^T y,$$

where y' is an output cancelled signal, y is a received signal, S is one of the matrices and $S^T$ is a transpose of said one of the matrices.

In another embodiment of the invention, the processing engine further comprises an interference selector configured for selecting the interfering signals as inputs to the matrix generators.

In another embodiment of the invention, the interference selector is further configured for providing on-time interfering PN codes of the interfering signals to the matrix generators.

In another embodiment of the invention, the interference selector selects the interfering signals based on a pre-determined criteria selected from a group consisting of amplitude, timing offset, phase and code sequence.

In one embodiment of the invention, a method of canceling interference comprises:

generating a plurality of matrices, each matrix comprising elements of an interference signal selected for cancellation;

generating a cancellation operator from each of the matrices; and applying each cancellation operator in parallel to an input signal to substantially cancel one of the interference signals.

In another embodiment of the invention, generating the cancellation operator comprises generating a projection operator having a form:

$$P_s^\perp = I - S(S^T S)^{-1} S^T,$$

where $P_s^\perp$ is the projection operator, I is an identity matrix, S is one of the matrices and $S^T$ is a transpose of said one of the matrices.

In another embodiment of the invention, applying comprises substantially canceling said one of the interfering signals according to the form:

$$y' = y - S(S^T S)^{-1} S^T y,$$

where y' is an output cancelled signal, y is a received signal, S is one of the matrices and $S^T$ is a transpose of said one of the matrices.

In another embodiment of the invention, the method further comprises selecting the interference signals for input to the matrices.

In another embodiment of the invention, the method further comprises providing on-time interfering PN codes of the interfering signals to the matrices in response to selecting.

In another embodiment of the invention, the method further comprises selecting output signals generated in response to applying, for assignment of the output signals to processing fingers of a receiver.

In another embodiment of the invention, the method further comprises transferring the output signals to the processing fingers in response to selecting said output signals as input signals to the processing fingers.

In another embodiment of the invention, the output signals are interference cancelled signals.

In another embodiment of the invention, the method further comprises receiving a Code Division Multiple Access signal.

In another embodiment of the invention, the method further comprises receiving a Wideband Code Division Multiple Access signal.

In another embodiment of the invention, the method further comprises receiving a Global Positioning System signal.

In one embodiment of the invention, a mobile handset comprises:

a receiver configured for receiving a radio signal; and a processing engine communicatively coupled to the receiver and comprising a plurality of matrix generators, wherein each matrix generator is configured for generating a matrix comprising elements of an interfering signal selected for cancellation, a processor communicatively coupled to the matrix generators and configured for generating a cancellation operator from each matrix, and a plurality of applicators, wherein each applicator is communicatively coupled to the processor and configured for applying one of the cancellation operators to an input signal to substantially cancel one of the interfering signals.

In another embodiment of the invention, the radio signal comprises a Code Division Multiple Access signal.

In another embodiment of the invention, the radio signal comprises a Wideband Code Division Multiple Access signal.

In another embodiment of the invention, the radio signal comprises a Global Positioning System signal.

DETAILED DESCRIPTION OF THE DRAWINGS

Figure 1:
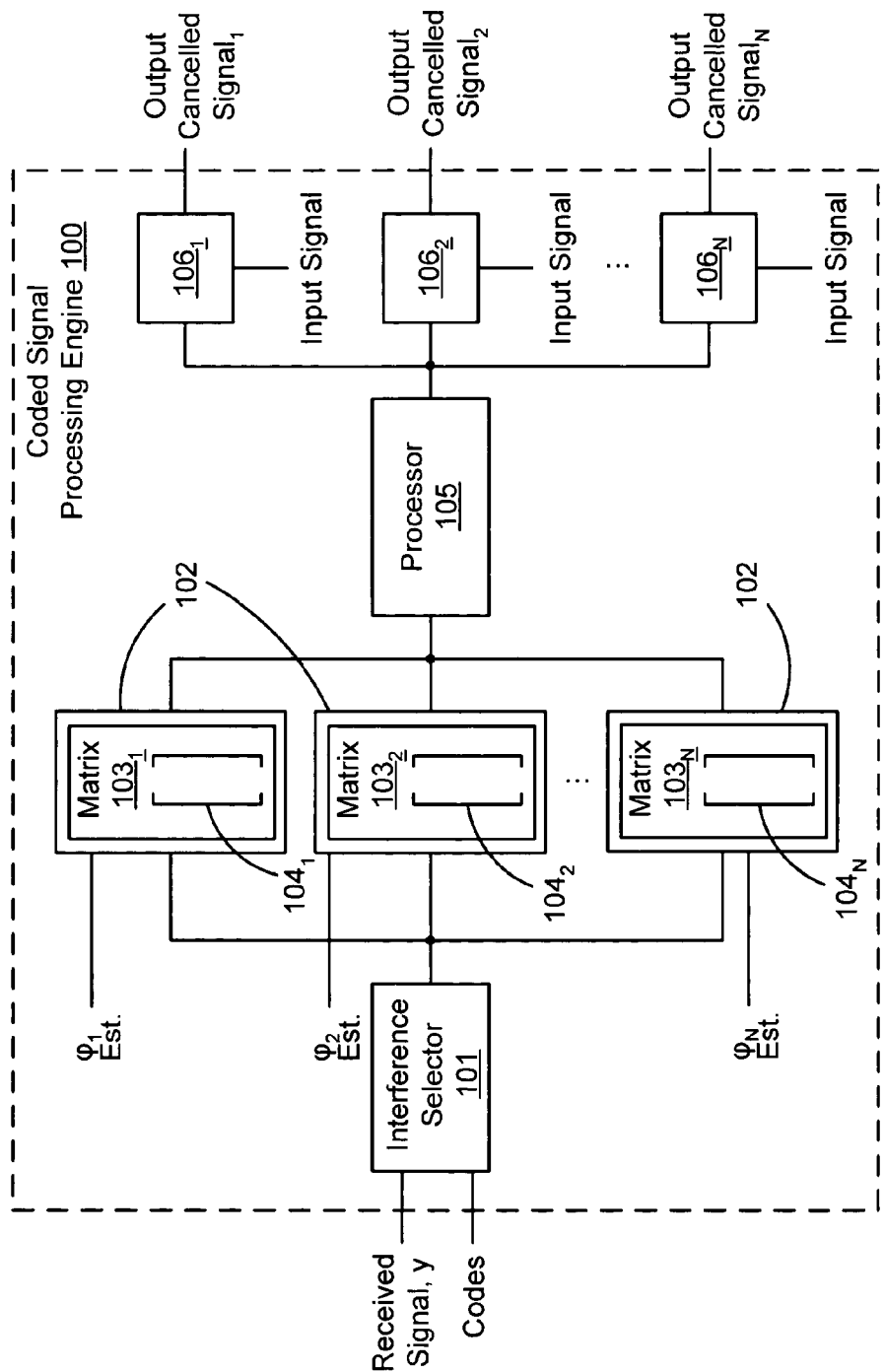
FIG. 1 is a block diagram of an exemplary coded signal processing engine in one embodiment of the invention.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the spirit and scope of the invention as defined by the claims.

FIG. 1 is a block diagram of exemplary coded signal processing engine 100 in one embodiment of the invention. Coded signal processing engine ("CSPE") 100 is used to substantially cancel interfering components from signals. Examples of such interfering components include co-channel interference and cross-channel interference typical of CDMA telephony. CSPE 100 substantially cancels selected interfering components by applying a cancellation operator to either a received signal y or selected coded reference signals. CSPE 100 thereby generates a plurality of output cancelled signals (i.e., labeled Output Cancelled Signals$_{1 \ldots N}$, where "N" is an integer greater than one), wherein the selected interfering components are substantially removed from the received signal y/coded reference signals. The coded reference signals may be "on-time" PN codes of signals used to decode signals selected for demodulation. On-time as used herein refers to a particular timing alignment for a PN code. Such a timing alignment may be relevant to extracting data from a signal being tracked within a receiver.

In this embodiment, CSPE 100 includes interference selector 101 for selecting interfering components and for providing selected "on-time" interfering PN codes to matrix generators 102 of CSPE 100. The interference selector may select the interfering signals based on pre-determined criteria, such as amplitude, timing offset, phase and/or code sequence. Matrix generators 102 are configured for using selected interfering codes and phase estimates (labeled $\phi_{1 \ldots N}$Est.) corresponding to those codes to generate matrices 103 (labeled matrices $103_{1 \ldots N}$). Each matrix 103 comprises one or more vectors 104 (labeled matrices $104_{1 \ldots N}$). Further, the vectors 104 comprise elements representing components of the interfering codes (e.g., such as those elements described in the '346 and the '360 applications). For example, each vector may include elements representing a unique code of an interfering signal (e.g., co-channel interference or cross-channel interference). The codes are typically Walsh covering codes and on-time PN codes of selected interferers. Each interference vector is multiplied by a phase estimate of a corresponding selected interferer. Phase estimation is exemplified in the '346 application.

As multiple vectors 104 may be used to represent multiple interfering signals, each matrix 103 may be representative of a unique plurality of interfering signals. For example, matrix 103$_1$ may include a single vector representing one interfering signal $A_1$ (not shown), whereas matrix 103$_2$ may include a single vector representing another interfering signal $A_2$ (not shown). The invention, however, is not intended to be limited to the exemplary embodiment shown herein.

CSPE 100 uses each matrix 103 to generate unique cancellation operators for selective cancellation of the interfering components. Accordingly, CSPE 100 includes processor 105 configured for processing matrices 103 to generate the cancellation operators. The cancellation operators may be projection operators that are used to project selected coded signals substantially orthogonal to the interference (e.g., the interference represented by the matrices 103) so as to substantially cancel or remove the interference from the selected coded signals. In a projection operator embodiment, processor 105 uses matrices 103 to generate the projection operators according to the following form:

$$P_s^\perp = I - S(S^T S)^{-1} S^T, \tag{Eq. 1}$$

where $P_s^\perp$ is the projection operator, I is an identity matrix, S is an interference matrix 103 and $S^T$ is a transpose of the matrix 103. Such projection operators and their associated constructions are described in the '346, the '360, the '829, the '219 and the '834 applications.

CSPE 100 applies the cancellation operator to selected input signals (labeled "Input Signal"). Each applicator 106 (labeled 106$_1 \ldots N$) applies one of the cancellation operators to an input signal. Each application of a cancellation operator typically provides a unique output cancelled signal which is the input signal with the selected interfering signal substantially. removed. For example, using the same signal notations of "A" as described above, applicator 106$_1$ may apply a projection operator $P_{s\_A1}^\perp$ to an input signal. The projection operator $P_{s\_A1}^\perp$, in this example, is generated from a matrix 103 comprising an interfering component of signal $A_1$. Once applied to the received signal y as the input signal, applicator 106$_1$ produces an Output Cancelled Signal$_I$ that corresponds to $y_{A1}' = P_{s\_A1}^\perp y$, where $y_{A1}'$ is the received signal with the interfering component $A_1$ substantially removed.

Similarly, applicators 106$_2$ and 106$_N$ may apply projection operators in parallel with applicator 106$_1$ to produce the respective unique signals Output Cancelled Signal$_2$ and Output Cancelled Signal$_N$. For example, applicator 106$_2$ may apply a projection operator $P_{s\_A2}^\perp$ such that the applicator produces an Output Cancelled Signal$_2$ corresponding to $y_{A2}' = P_{s\_A2}^\perp y$, where $y_{A2}'$ is the received signal with the interfering component $A_2$ substantially removed. Parallel as used herein implies the substantially simultaneous generations of unique cancellation operators and the subsequent applications of the cancellation operators to independent input signals.

In an alternative embodiment, cancellation may be performed by applying a construction of the matrices as follows:

$$y' = y - S(S^T S)^{-1} S^T y. \tag{Eq. 2}$$

In such an embodiment, the received signal y is multiplied by the interference matrix construction of Eq. 1. However, that product is subtracted from the received signal y to produce an output cancelled signal y', such as $y_{A1}'$ and $y_{A21}'$. Those skilled in the art should readily recognize that the two approaches produce substantially the same result.

While one exemplary embodiment has been shown in detail, the invention is not intended to be limited to the examples described and illustrated herein. For example, applicators 106 may apply other cancellation operators to other input signals to produce a variety of output cancelled signals. One example of another input signal is an on-time reference PN code, such as that described below in FIG. 4. Examples of other methods for the production of cancellation operators include subtractive methods, decorrelators and decision feedback.

Additionally, the invention is not intended to be limited to the number of applicators 106, input signals, output cancelled signals, matrix generators 102 and processors 105. For example, processor 105 may be either a single processor configured for generating a plurality of cancellation operators or processor 105 may represent a plurality of processors each of which is similarly configured for generating a unique cancellation operator. Examples of such processors include general purpose processors and Application Specific Integrated Circuits ("ASIC"). Accordingly, the processor may be operably controlled via software and/or firmware instructions to generate the cancellation operators. Those skilled in the art are familiar with processors, ASICs, software, firmware and the various combinations thereof which may be used in such implementations.

Moreover, those skilled in the art should readily recognize that CSPE 100 in general as described herein may be implemented through software, firmware, hardware and/or various combinations thereof. For example, the generations of the cancellation operators and the subsequent cancellations of interfering signals may be computed through the use of software instructions (e.g., firmware) operable within a processor or specified in hardware architecture.

Figure 2:
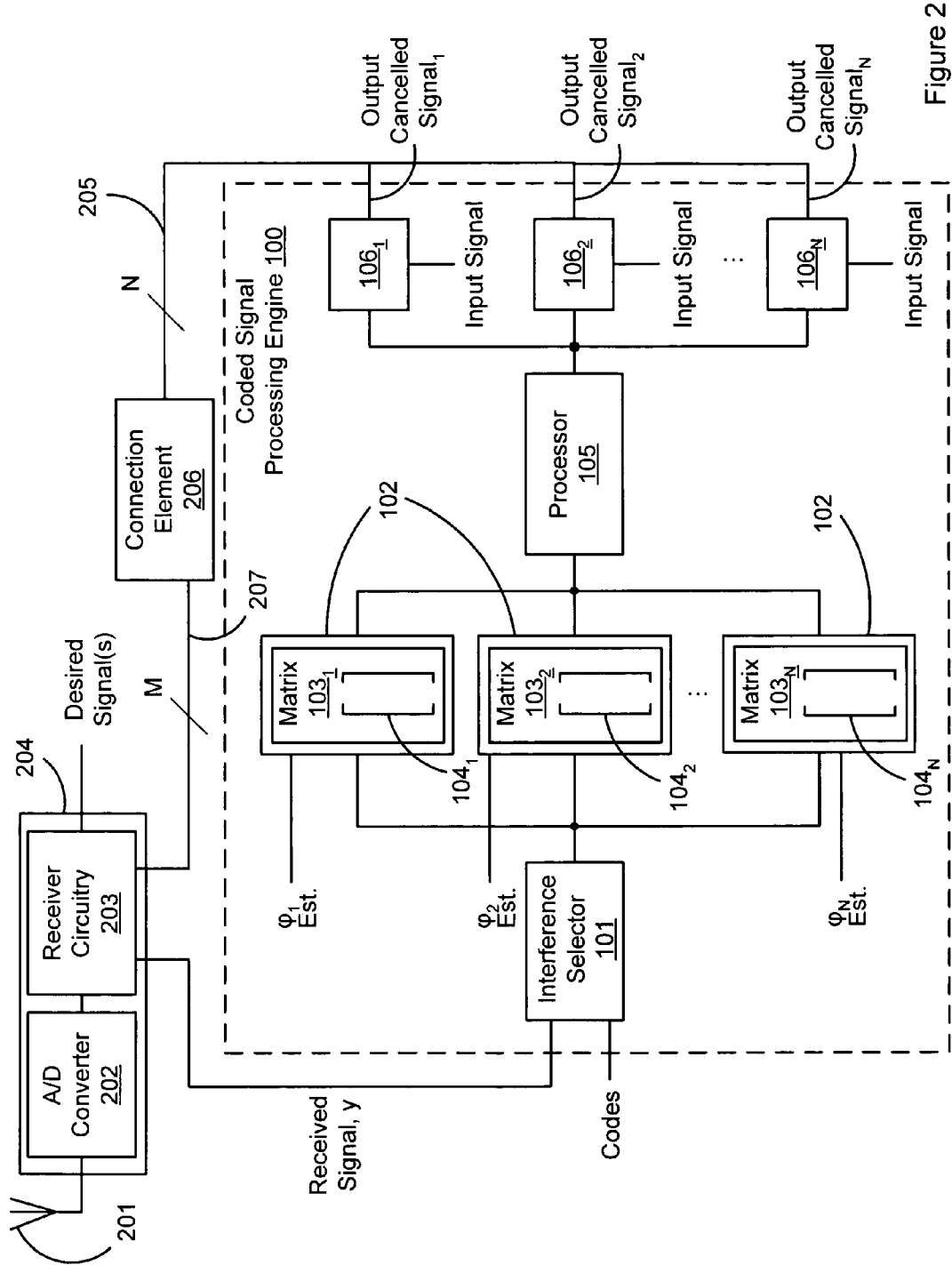
FIG. 2 is a block diagram of the exemplary coded signal processing engine configurable with a receiver in one embodiment of the invention.

FIG. 2 is a block diagram of the exemplary CSPE 100 of FIG. 1 configurable with receiver 204 in one embodiment of the invention. In this embodiment, receiver 204 receives a radio frequency ("RF") signal through antenna 201 and subsequently converts that signal to a digital received signal y using Analog-to-Digital ("A/D") converter 202. A/D converter 202 transfers the digital signal to receiver circuitry 203 for signal processing. Those skilled in the art should readily recognize that the processing of CDMA signals typically includes both In-phase ("I") and Quadrature ("Q") components. As such, the digital received signal y may include both I and Q components as well.

In this embodiment, receiver circuitry 203 is configured for transferring the digitized received signal y to CSPE 100 for cancellation of interfering signals. CSPE 100 receives the signal y as well as known codes from the interfering signals. For example, the interfering signals may be cross channel and/or co-channel interfering signals comprising known codes of CDMA telephony systems. Such codes may be input to CSPE 100 on an as needed basis or stored within a memory (not shown) local to the CSPE 100. Alternatively, the codes may be generated by processor 105 on an as needed basis.

Operable characteristics of CSPE 100 are the same as those described in FIG. 1. However, again using the same signal notations of "A" as described above, in this preferred receiver embodiment, CSPE 100 uses applicators 106$_{1 \ldots N}$ to apply cancellation operators to the input signals in the following manner:

Applicator 106$_1$ produces an Output Cancelled Signal$_1$ that corresponds to $y_{A1}' = P_{s\ A1}^{-1} y$, where again $y_{A1}'$ is the received signal with the interfering component $A_1$ substantially removed;

Applicator 106$_2$ produces an Output Cancelled Signal$_2$ corresponding to $y_{A2}' = P_{s\ A2}^{-1} y$; and where again $y_{A2}'$ is the received signal with the interfering component $A_2$ substantially removed.

These Output Cancelled Signal$_{1 \ldots N}$ are transferred to connection element 206 via "N" channel connection 205. For example, "N" channel connection 205 may be a communicative connection such as a data bus that allows for the transfer of "N" number of channels to connection element 206. Consequently, connection element 206 may be configurable to receive such an "N" channel connection.

Connection element 206 is configured for selectively transferring Output Cancelled Signal$_{1 \ldots N}$ to receiver circuitry 203 of receiver 204 via "M" channel connection 207. For example, connection element 206 may be a switching device, multiplexer, a plurality of multiplexers or another similar communication device that selectively transfers "N" number of signals to "M" number of channels, where "M" is also a number greater than one. As such, "M" channel connection 207 is similar to "N" channel connection 205.

The control for connection element 206 may be applied independently of cancellation processing. Consequently, connection element 206 may or may not be configured within the CSPE 100. For example, should the selection of Output Cancelled Signal$_{1 \ldots N}$ be received by receiver circuitry 203 be decided by receiver 204, then connection element 206 may reside outside of the embodied CSPE 100. In a preferred embodiment, however, CSPE 100 includes the control functionality for connection element 206 that determines which of the Output Cancelled Signal$_{1 \ldots N}$ are transferred to receiver circuitry 203. Accordingly, the invention should not be limited to the preferred embodiment described and shown herein.

Figure 3:
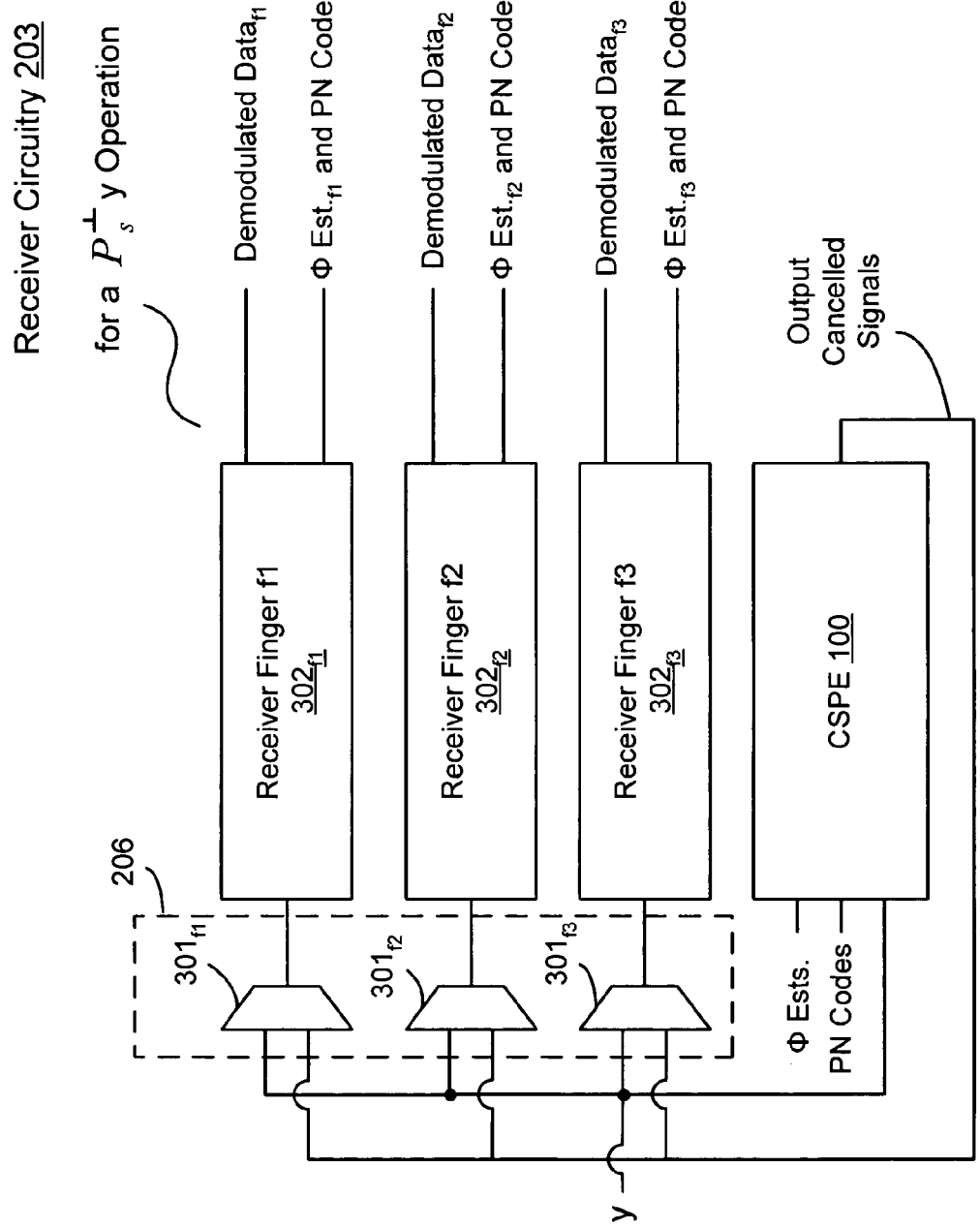
FIG. 3 is a block diagram of exemplary receiver circuitry.

FIG. 3 is a block diagram of exemplary receiver circuitry 203. In this embodiment, receiver circuitry 203 is configured with CSPE 100 via connection element 206 for selectively tracking signals through receiver fingers f1, f2 and f3 (labeled 302$_{f1}$, 302$_{f2}$ and 302$_{f3}$). For example, connection element 206 may allow the receiver circuitry 203 to track and subsequently demodulate a selected combination of Output Cancelled Signal$_{1 \ldots N}$ and the received signal y through the receiver fingers f1, f2 and f3.

In a preferred embodiment, a first receiver finger f1 receives the signal y via a corresponding selector (the selectors are labeled 301$_{f1 \ldots f3}$). The phase estimate $\phi_{f1}$ and the PN code$_{f1}$ outputs of the first receiver finger f1 are transferred from the finger to CSPE 100 for producing the output cancelled signal $y_{A1}'$ described in FIGS. 1 and 2. A second receiver finger f2 selectively receives either y or $y_{A1}'$ via a corresponding selector for tracking of a second assigned signal. If y is transferred to the second receiver finger f2, the phase estimate $\phi_{f2}$ and the PN code$_{f2}$ outputs of that second receiver finger are transferred to CSPE 100 to produce the output cancelled signal $y_{A2}'$ also described in FIGS. 1 and 2. Consequently, a third receiver fingers f3 has a selection of signals y and output cancelled signals $y_{A1}'$ and $y_{A2}'$ to track and demodulate a third assigned signal.

In many instances, tracking, demodulation and cancellation of the signals described and shown herein the preferred embodiment is all that is necessary in CDMA telephony because there are typically only one or two signals (e.g., A1 and A2) that degrade reception beyond the point of intended data recovery. Accordingly, selective cancellation of only one or two signals may decrease processor consumption requirements and thereby improve overall processing performance of the system. As such, the embodiment should not be limited to the number of receiver fingers shown and described. More receiver fingers than those illustrated in this exemplary embodiment may be used to selectively track and demodulate signals according to the principles described herein.

Figure 4:
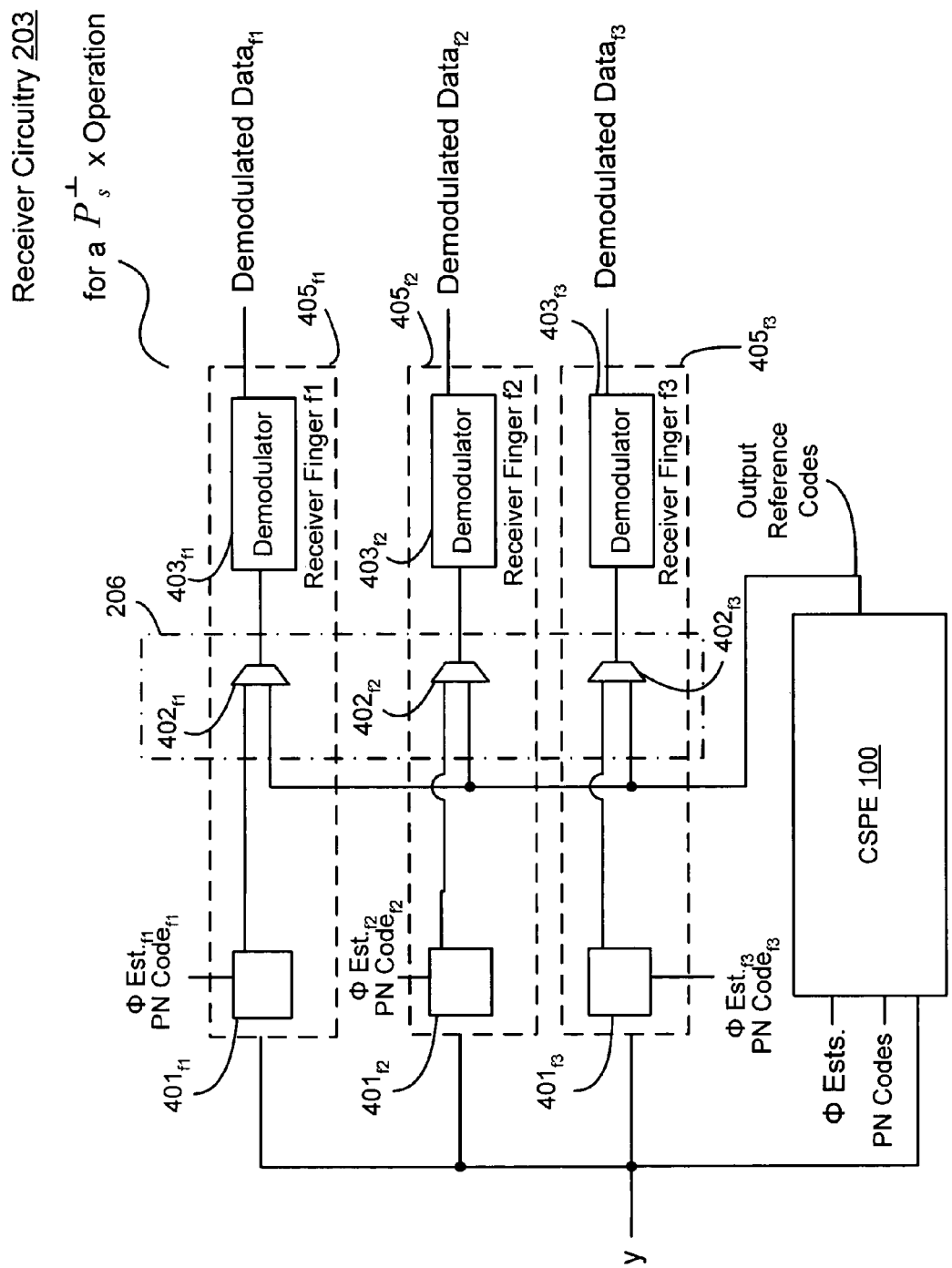
FIG. 4 is another block diagram of exemplary receiver circuitry.

FIG. 4 is another block diagram of exemplary receiver circuitry 203. In this alternative embodiment, the received signal y is transferred to receiver fingers f1, f2 and f3 (labeled 405$_{f1 \ldots f3}$) and CSPE 100. Time tracking and phase estimation of the received signal y may be performed for each finger in corresponding elements 401$_{f1 \ldots f3}$. Such tracking and phase estimation is used to generate on-time reference PN codes (PN code$_{f1 \ldots f3}$) and is described in greater detail in the '346 application. Elements 401$_{f1 \ldots f3}$ transfer the on-time reference PN codes as well as the phase estimates (labeled $\phi_{f1 \ldots f3}$) to CSPE 100 and to corresponding selectors 402$_{f1 \ldots f3}$. CSPE 100 uses these on-time PN codes and phase estimates to generate cancellation operators that remove interfering signals from the received signal y.

Differing from the embodiment of FIG. 3, CSPE 100 uses the applicators 106 of FIGS. 1 and 2 to apply cancellation operators to the on-time PN codes to produce output cancelled versions of the codes (labeled output reference codes). Such an embodiment may conform to a cancellation of the form $P_s^{-1} x$, where x is an on-time reference PN code. These output cancelled reference codes are selectively transferred to demodulators 403$_{f1 \ldots f2}$ via selectors 402$_{f1 \ldots f2}$ of connection element 206. These codes are used by the demodulators 403$_{f1 \ldots f2}$ to demodulate the received signal y. Such demodulation may be performed with a correlation of a reference code and a received signal over a period of a symbol and is well known to those skilled in the art.

In a preferred embodiment, a first receiver finger f1 receives the on-time reference PN code $x_{f1}$ via a first selector 402$_{f1}$ and produces the phase estimate $\phi_{f1}$ and the PN code$_{f1}$ outputs. The first finger f1 then demodulates the received signal y using the code $x_{f1}$. These phase estimate $\phi_{f1}$ and the PN code$_{f1}$ outputs of that first receiver finger f1 may be transferred from the finger f1 to CSPE 100 for producing the output cancelled signal $x_{A1}'$, where $x_{A1}'$ is the on-time reference PN code of the signal selected for demodulation without the interfering effects of the signal A1. A second receiver finger f2 selectively receives either x or $x_{A1}'$ via corresponding selector 402$_{f2}$. If x is transferred to the second receiver finger f2, the phase estimate $\phi_{f2}$ and the PN code$_{f2}$ outputs of receiver finger f2 are transferred to CSPE 100 to produce the output cancelled signal $x_{A2}'$, where $x_{A2}'$ is the on-time reference PN code of the signal selected for demodulation without the interfering effects of the signal A2. Consequently, a third receiver finger f3 has a selection of signals $x_{f3}$ and output cancelled on-time reference PN codes $x_{A1}'$ and $x_{A2}'$ which can be used to track and demodulate the received signal y.

Again, those skilled in the art should readily recognize that the preferred embodiment should not be limited to that which is shown and described herein. More receiver fingers than those illustrated and described herein the exemplary embodiment may be used to selectively track and demodulate signals according to the principles described herein.

Figure 5:
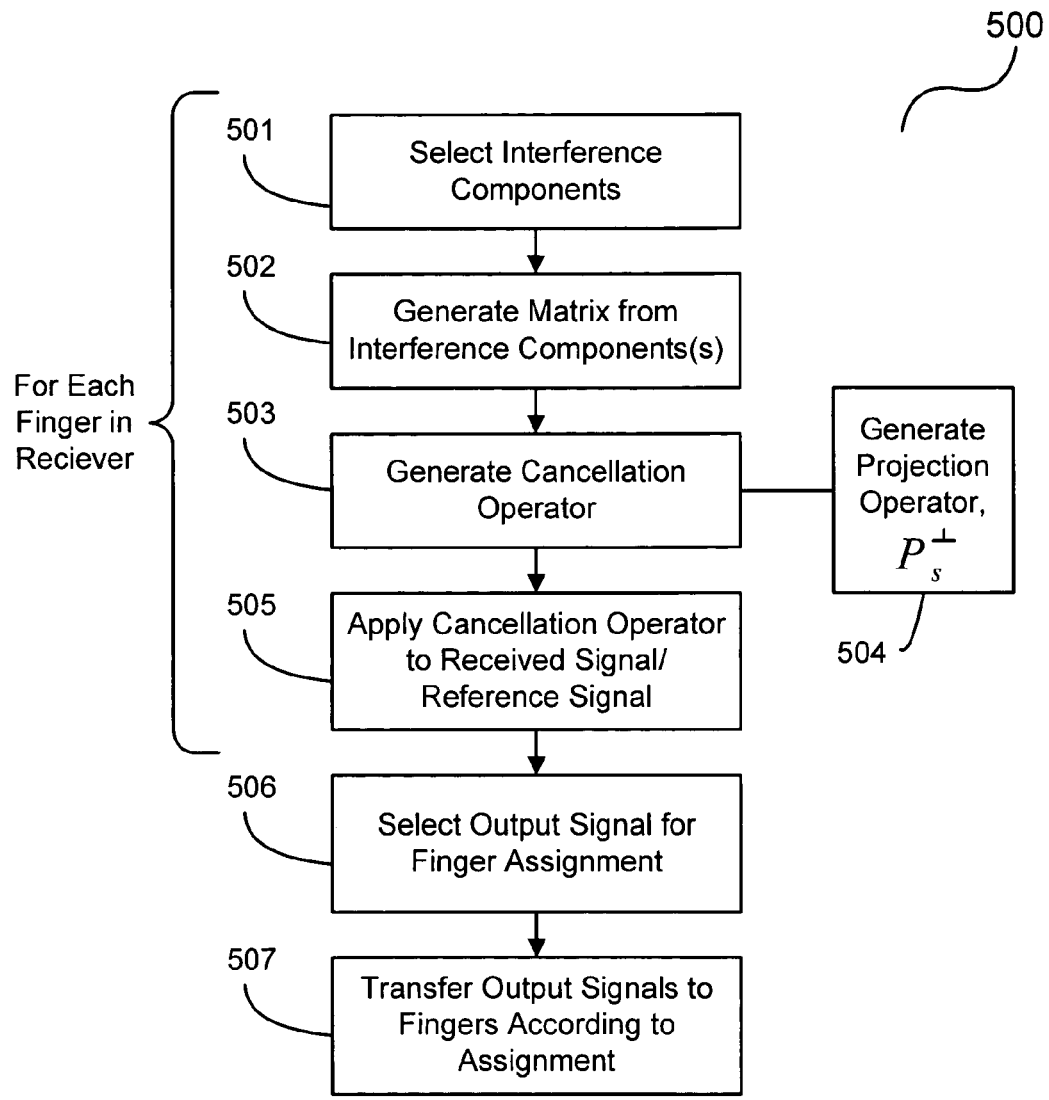
FIG. 5 is a flow chart illustrating one exemplary methodical embodiment of the invention.

FIG. 5 is a flow chart 500 illustrating one exemplary methodical embodiment of the invention. In this embodiment, one or more interference components of a received signal are selected, in element 501. These interference components are used to generate an interference matrix, in element 502. A cancellation operator is generated from the interference matrix, in element 503. The cancellation operator may be a projection operator as described in FIG. 1 that is generated in element 504 to substantially orthogonally project a received signal from interfering components. Such a projection operator may substantially cancel or remove the interfering components from the received signal. The cancellation operator is applied to either the received signal or an on-time reference PN code, in element 505.

Elements 501 through 505 are performed in parallel based on the number of receiver fingers used for tracking and demodulation in a receiver. For example, in a receiver comprising three fingers, such as the receiver circuitry 203 in FIGS. 4 and 5, elements 501 through 505 may be performed three times in a substantially simultaneous fashion. Moreover, control functionality may be configured to only select information of particular fingers. For example, if a signal does not contribute significantly to the interference, it may be selectively excluded from the cancellation process to decrease processing. Such a selection process is described in the '954 application.

The application of the cancellation operators in element 505 produces output cancelled signals such as those described herein. Once those output cancelled signals are produced, the signals are selected for finger assignments, in element 506. Such a selection process may be performed by connection element 206 in FIG. 3. Selected output cancelled signals are transferred to the receiver fingers according to their respective finger assignments, in element 507. Within their respective fingers, the output cancelled signals are either tracked and demodulated as in FIG. 3 or are used to track and demodulate a received signal as in FIG. 4.

The embodiments described herein may substantially reduce interference caused by unwanted signals and improve signal processing. For example, poor signal quality due to interference may deleteriously affect acquisition, tracking and demodulation of selected signals. A reduction of interference may, therefore, result in improved signal processing and error reduction. In regards to such benefits, the embodiments herein may advantageously require use within a CDMA telephony system. Improved processing within a CDMA telephony system may be exploited in terms of increased system capacity, transmit power reduction, system coverage and/or data rates. However, those skilled in the art should readily recognize that the above embodiments should not be limited to any particular method of signaling. For example, the embodiments disclosed herein may also be advantageous to systems employing CDMA (e.g., such as cdmaOne and cdma2000), WCDMA, Broadband CDMA and GPS signals.

Additionally, it should be noted that the above embodiments of the invention may be implemented in a variety of ways. For example, the above embodiments may be implemented from software, firmware, hardware or various combinations thereof. Those skilled in the art are familiar with software, firmware, hardware and their various combinations. To illustrate, those skilled in the art may choose to implement aspects of the invention in hardware using ASIC chips, Digital Signal Processors ("DSP") and/or other integrated circuitry (e.g., custom designed circuitry and Xilinx chips). Alternatively, aspects of the invention may be implemented through combinations of software using Java, C, C++, Matlab, and/or processor specific machine and assembly languages. Accordingly, those skilled in the art should readily recognize that such implementations are a matter of design choice and that the invention should not be limited to any particular implementation.

While the invention has been illustrated and described in detail in the drawings and foregoing description, such illustration and description is to be considered as exemplary and not restrictive in character. Accordingly, it should be understood that only the preferred embodiment and minor variants thereof have been shown and described and that all changes and modifications that come within the spirit of the invention are desired to be protected.

The invention claimed is:

1. A receiver comprising:
  a first finger configured to receive a non-interference-cancelled signal and output first demodulated data, a first phase estimate, and a first PN code;
  a second finger configured to:
    selectively receive the non-interference-cancelled signal and a first interference-cancelled signal generated from the non-interference-cancelled signal based on the first phase estimate and the first PN code; and
    output second demodulated data; and
  a selector configured to selectively provide the non-interference-cancelled signal or the first interference-canceled signal to the second finger.

2. The receiver of claim 1, wherein the receiver comprises a rake receiver.

3. The receiver of claim 1, wherein the non-interference-cancelled signal comprises a code-division multiple access (CDMA) signal.

4. The receiver of claim 3, wherein the first interference-cancelled signal comprises a CDMA signal.

5. The receiver of claim 1, wherein the first finger outputs the first demodulated data and the second finger outputs the second demodulated data simultaneously.

6. The receiver of claim 1, wherein the second finger is further configured to output a second phase estimate and a second PN code.

7. The receiver of claim 6, further comprising a third finger configured to:
  selectively receive the non-interference-cancelled signal, the first interference-cancelled signal, and a second interference-cancelled signal generated from the non-interference-cancelled signal based on the second phase estimate and the second PN code; and
  output third demodulated data.

8. The receiver of claim 7, wherein the non-interference-cancelled signal comprises a CDMA signal.

9. The receiver of claim 8, wherein the first interference-cancelled signal and the second interference-cancelled signal comprise a CDMA signal.

10. The receiver of claim 1, wherein the first finger outputs the first demodulated data, the second finger outputs the second demodulated data, and the third finger output the third demodulated data simultaneously.

11. The receiver of claim 7, wherein the third finger is configured to output a third phase estimate and a third PN code.

12. A method comprising:
  receiving, at a first receiver finger, a non-interference-cancelled signal;
  outputting, by the first receiver finger, first demodulated data, a first phase estimate, and a first PN code;

selecting one of the non-interference-cancelled signal or a first interference-cancelled signal;

receiving, at a second receiver finger, the selected one of the non-interference-cancelled signal or the first interference-cancelled signal; and outputting, by the second receiver finger, second demodulated data.

13. The method of claim 12, wherein the non-interference-cancelled signal comprises a code-division multiple access (CDMA) signal.

14. The method of claim 13, wherein the first interference-cancelled signal comprises a CDMA signal.

15. The method of claim 12, wherein the first receiver finger outputs the first demodulated data and the second receiver finger outputs the second demodulated data simultaneously.

16. The method of claim 12, further comprising outputting, by the second receiver finger, a second phase estimate and a second PN code.

17. The method of claim 16, further comprising:

receiving, at a third receiver finger, a selected one of the non-interference-cancelled signal, the first interference-cancelled signal, and a second interference-cancelled signal generated from the non-interference-cancelled signal based on the second phase estimate and the second PN code; and outputting, by the third receiver finger, third demodulated data.

18. The method of claim 17, wherein the first finger outputs the first demodulated data, the second finger outputs the second demodulated data, and the third finger output the third demodulated data simultaneously.

19. The method of claim 17, further comprising outputting, by the third receiver finger, a third phase estimate and a third PN code.

* * * * *